July 17, 1956 F. H. MASON ET AL 2,754,546
MOLD
Original Filed April 6, 1948 4 Sheets-Sheet 1
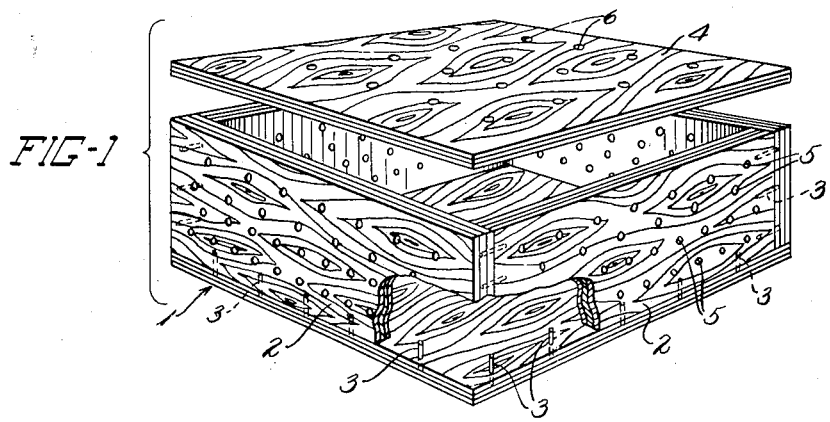
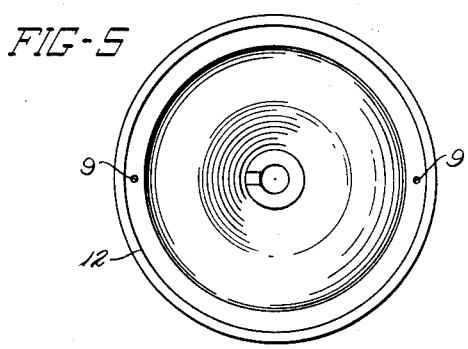
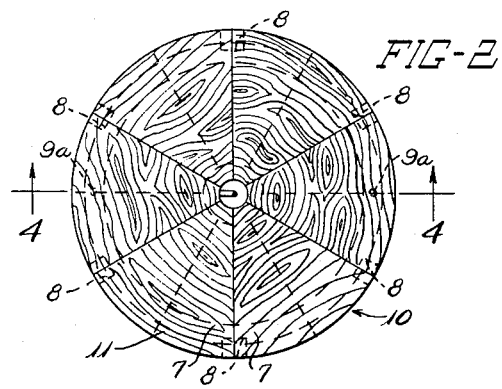
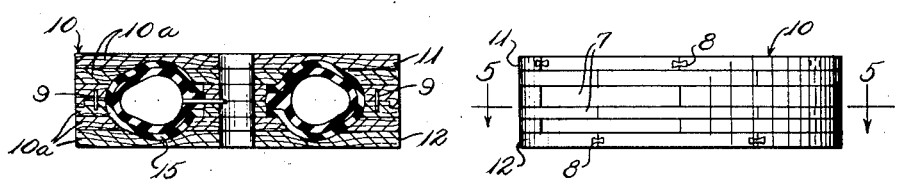
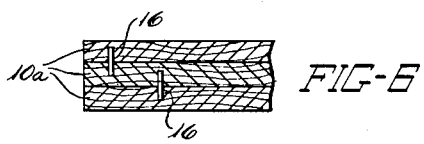
INVENTORS
FRED H. MASON
GEORGE P. BOSWORTH
BY
W. A. Fraser
ATTY.

July 17, 1956   F. H. MASON ET AL   2,754,546
MOLD
Original Filed April 6, 1948   4 Sheets-Sheet 2

INVENTORS
FRED H. MASON
GEORGE P. BOSOMWORTH
BY
W. A. Fraser
ATTY.

July 17, 1956　　　F. H. MASON ET AL　　　2,754,546
MOLD
Original Filed April 6, 1948　　　　　　　　4 Sheets-Sheet 3
FIG-10
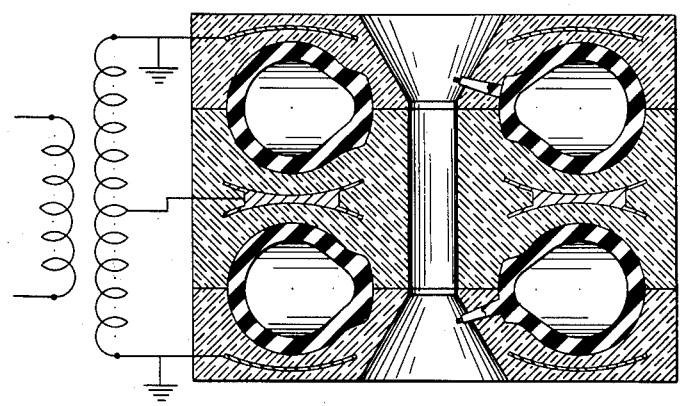
FIG-11
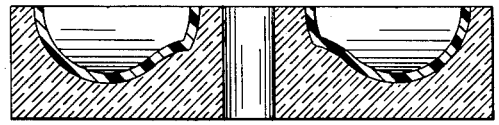
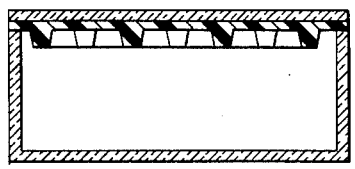
FIG-12
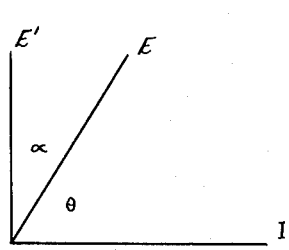
FIG-13
INVENTORS
FRED H. MASON
GEORGE P. BOSOMWORTH
BY
W. A. Fraser
ATTY.

July 17, 1956 F. H. MASON ET AL 2,754,546
MOLD
Original Filed April 6, 1948 4 Sheets-Sheet 4
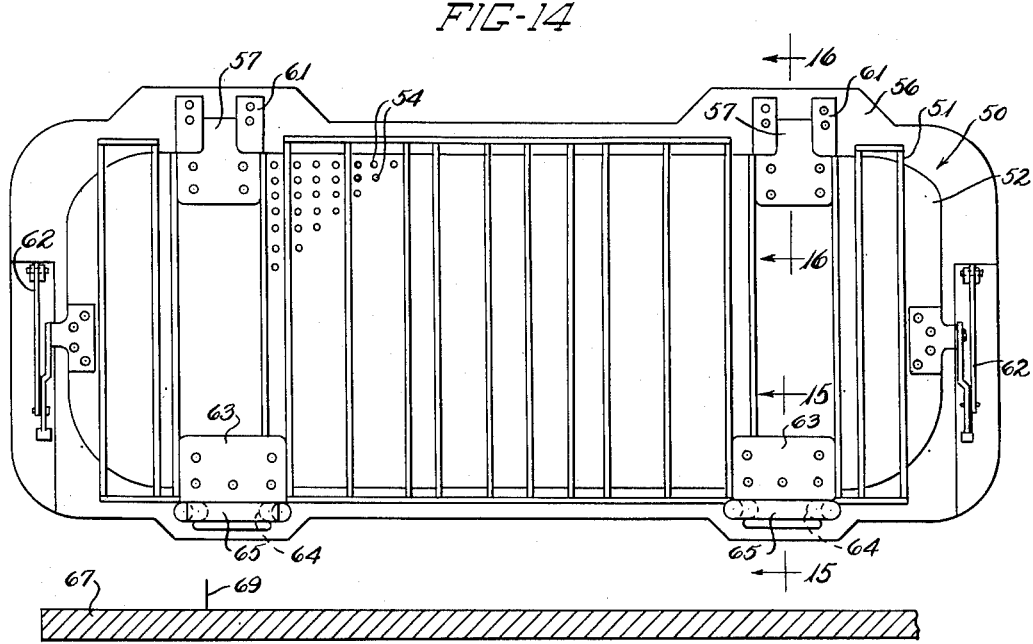
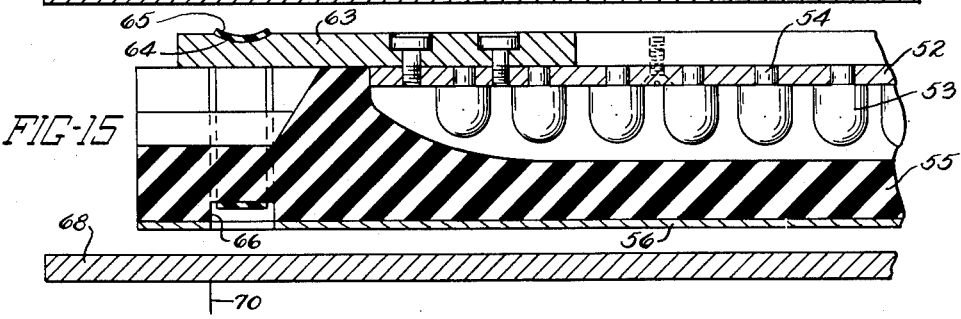
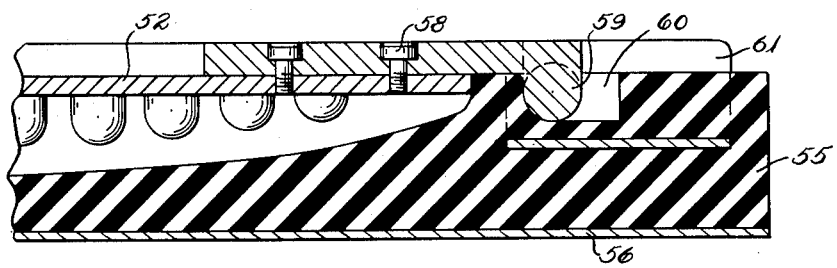
INVENTORS
FRED H. MASON
GEORGE P. BOSOMWORTH
BY
W. A. Fraser
ATTY.

United States Patent Office 2,754,546
Patented July 17, 1956

2,754,546
MOLD

Fred H. Mason, Natick, Mass., and George P. Bosomworth, Akron, Ohio, assignors to The Firestone Tire & Rubber Company, Akron, Ohio, a corporation of Ohio Continuation of application Serial No. 19,386, April 6, 1948. This application November 13, 1951, Serial No. 255,930

6 Claims. (Cl. 18—34)

This invention relates to the art of fabricating or treating rubber materials with high frequency electrical energy, and more specifically to the type of molds used therewith when vulcanizing said rubber materials, and is a continuation of our application Serial No. 19,386, filed April 6, 1948, now abandoned, which was a continuation-in-part of our application Serial No. 745,550, for Mold, filed May 2, 1947, now abandoned.

The introduction of the step of treatment by high frequency electrical energy in the manufacture of rubber articles fabricated from compositions of rubber or rubber-like materials, such as natural rubber latex, artificial aqueous dispersions of natural or reclaimed rubber, latices or water dispersions of butadiene-styrene, butadiene-acrylonitrile, isoprene-styrene, or neoprene (polychloroprene) type synthetic rubbers has given rise to new problems in the selection of suitable mold material having at the same time the proper dielectric characteristics and physical properties. It is desirable that the curing be accomplished in the mold in which the dispersion or composition is poured and gelled because removal from the original mold after gelling, but before vulcanization, usually results in deformation or damage to the molded article.

In the past it has been common practice to use metal molds for manufacturing such articles. The molds having substantial components of conducting material so arranged as to present a low impedance path cannot be used where the mold must be placed in the high frequency electrical field because such a mold would effect a short circuit of the high frequency energy. Therefore it is necessary that the mold, being made mainly of a dielectric material, must also have other necessary characteristics as outlined below.

It is important that the mold material be selected with consideration given to the so-called "dielectric loss factor." This factor should match as closely as is practical "loss factor" of the material subjected to the high frequency energy. Under this condition heating of the work material will approximately equal heating of the mold as the result of the high frequency current, with the desirable result that heat flow therebetween is maintained at a minimum.

Such a mold must of course not only be heat and water resistant, but must be sufficiently rugged to withstand normal use without breaking or warping as a result of the heat to which it is subjected. Molds suitable for use in treating or vulcanizing rubber with high frequency electrical energy should have the following permanent characteristics, it being evident that the material ultimately selected for such purpose will represent a compromise between the degree of presence of these characteristics.

(1) High resistivity.
(2) High dielectric strength at operational temperatures.
(3) High thermal insulation.
(4) Capability of retaining shape under curing conditions.
(5) Proper design—for example, a mold adapted to receive sponge rubber should be designed in a manner to permit adequate filling in a reasonable time.
(6) The external shape should permit use on production conveyor systems where employed.
(7) The molding surface must remain rigid under normal pressure and temperature conditions.
(8) Material should preferably be of low density.
(9) Low specific heat is desirable.

Many materials having apparently desirable properties, including ordinary glass, wood and porcelain have been tried. Also, various plastics have been used in the fabrication of this type of mold but none of these materials is considered commercially satisfactory for large quantity production. Ordinary glass and porcelain, for example, are too heavy and fragile for the molding of large articles in large numbers. The dielectric loss factor of some of the synthetic plastics is too large and they therefore become heated too readily when they are subjected to the high frequency electrical field. Wood, even when coated with ordinary coating materials, absorbs moisture to such an extent that arcing is induced between the electrodes over or through the mold and the molded material.

It is therefore a general object of this invention to provide a mold well adapted to large scale manufacturing operations in which articles of natural or synthetic rubber or rubber-like materials may be molded and uniformly treated with high frequency electrical energy.

More particularly, it is an object to provide a mold which, while having the required physical strength, will also have such dielectric characteristics relative to the dielectric characteristics of the material of the article under treatment that the article will not be subjected to excessive localized temperatures.

It is a further object to provide a dielectric mold in which the dielectric loss and therefore the temperature rise will be approximately the same as that of the material under treatment while the material is in the incompletely treated stage.

A further object is to provide a durable inexpensive mold which may be used in the fabrication of comparatively large articles such as mattresses.

Another object is to provide molds which may be stored and handled in large numbers without damage and without the exercise of more than ordinary care.

A further object is to provide molds which will not be subject to dielectric failure.

The foregoing and other objects will be readily understood from the subsequent description when considered in connection with the accompanying drawings, in which, Fig. 1 is an exploded perspective view of a mold in accordance with the present invention;

Fig. 2 is a plan view of a tire mold constituting another embodiment of the invention;

Fig. 3 is a side elevation thereof;

Fig. 4 is a section on the line 4—4 of Fig. 2, showing the mold and a tire therein;

Fig. 5 is a plan view of the lower half of the tire mold as viewed from the line 5—5 of Fig. 3, the tire being omitted therefrom;

Fig. 6 is a fragmentary section on a larger scale of the tire mold showing dowel pins that hold together the laminations of the mold structure;

Fig. 10 is a diametric cross-section of a tire mold constituting a further modified form of the invention illustrating the presence of electrodes in the material of the mold, and showing the work in the mold, and an associated circuit;

Fig. 11 is a sectional view of a further modified mold in which the molding surface is made of a resinous material different from that of the body of the mold;

Fig. 12 is a sectional view of a still further modified mold;

Fig. 13 shows current-voltage relation in a condenser.

Fig. 14 is a plan view of a modified mold;

Fig. 15 is an enlarged section taken on the line 15—15 of Fig. 14, with electrodes shown, and Fig. 16 is an enlarged section taken on the line 16—16 of Fig. 14.

Figure 7:
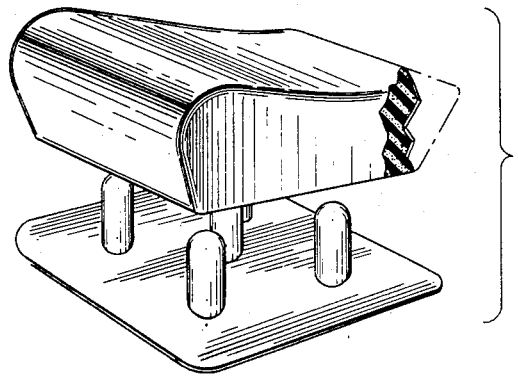
Fig. 7 is a perspective view of a mold constituting an alternative construction in accordance with the invention that employs resin-impregnated materials such as nylon, cotton, rayon, glass fibers, and the like, a part being broken away to reveal the work therein.

It has been found that the objects of this invention can be accomplished by the use of a mold made of wood which is coated or impregnated with a water and heat-resistant synthetic resinous material having characteristics hereinafter set forth. Also, the objects of the invention can be accomplished by the use of molds fabricated from materials such as fiber glass, rayon, nylon, or cotton, which materials are bound together by or serve as a filler material for, a synthetic resin having certain characteristics described later in the description. One of the advantages of a mold made of a resin-bound composition is that a cured tire or other fabricated object can be used as the master male mold to form the desired design on an internal cavity of the mold. A satisfactory mold can also be made by using a resin-bound composition and a backing support made of the specially treated wood. If desired, conducting electrodes, to which the high frequency electrical energy is supplied, may be imbedded in the resin-bound composition and may be so shaped and arranged as to produce the desired electrical field distribution around the material or article being treated.

It has also been found, as a matter not at all obvious, that a mold fabricated of the same material as that being vulcanized, namely rubber, is a highly satisfactory and, in fact, a preferred form of mold for the purposes of this invention. In fact, it is believed that a mold for rubber which is itself made of rubber is novel from any standpoint.

The mold material should have electrical insulating characteristics such that it will not break down under the high electrical stress necessary in carrying out the invention. It should be a good thermal insulator. It is preferable that the mold material be chosen to have electrical and thermal properties, the combined effects of which substantially match the material being cured. The changes in those properties of the mold material resulting from changes in temperature, frequency of applied electrical energy, chemical composition, or other variables in process, should preferably match similar changes in the work. To properly match the properties of the mold and the work, it will be necessary to compute the power density (dielectric loss per unit volume) by the equation $$\text{Power density} = 1.41 f(E')^2 e'' \text{ watts/cu. in.} \quad (1)$$

where $f$ = frequency in megacycles per second
$E'$ = voltage gradient in kilovolts/inch
$e''$ = loss factor In the equation it will be seen that the power density is determined solely by the frequency and voltage gradient of the applied electrical energy and by the loss factor $e''$ of the material being processed. This value of power density is determined as follows:

"Loss factor" is defined as the power factor times the dielectric constant K of the material in question. The latter figure is either known and obtainable from reference tables, or is obtainable in a known manner, as through the use of a radio frequency bridge.

In a perfect condenser the current vector I leads the voltage vector E' by 90°, as shown graphically in Fig. 13, and there is no power absorption; however, in actual practice, the voltage across the condenser plates takes some position such as making an angle $\theta$ with the current vector I. The power absorbed, Pa, by the material between the plates of a condenser, manifests itself as heat and molecular activity and is given by the equation $$P_a = EI \cos \theta \quad (2)$$

and the apparent power by $$P = EI \quad (3)$$

where $E$ = voltage across condenser plates
$I$ = current in the circuit

The power factor is the ratio of power absorbed to apparent power; then $$\frac{P_a}{P} = \frac{EI \cos \theta}{EI} = \cos \theta$$

Since $90° - \theta = \alpha$, $\sin \alpha = \cos \theta$, and where $\alpha$ is small (as in dielectric heating) and radians, $\sin \alpha = \alpha$; therefore, Power factor $= \alpha$ and Loss factor $e'' = K\alpha$ The power density in the dielectric material is the amount of power absorbed by the material per unit volume and may be computed as follows:

Referring to Equation 2, $P_a = EI \cos \theta$, and substituting $\alpha$ for $\cos \theta$ $$P_a = EI\alpha \quad (4)$$

Since the capacity C of a parallel plate condenser is given by $$C = mK\frac{A}{d} \quad (5)$$

where $m$ = a constant depending on system of units
$A$ = area of one plate
$d$ = distance between plates
$K$ = dielectric constant
$Ad$ = the volume of the interelectrode space, and $\frac{P_a}{Ad}$ = power absorbed per unit volume = power density Since, in a charged condenser $$I = 2\pi f EC \quad (6)$$

where $f$ = frequency of applied power
$C$ = total capacity of condenser
$E$ = applied voltage substituting in Equation 6, the values of C in Equation 5

$$I = 2\pi f E m K \frac{A}{d}$$

substituting this value of I in Equation 4

$$P_a = 2\pi f E^2 m K \frac{A}{d} \alpha \quad (7)$$

Rearranging and dividing each side by $Ad$ $$\frac{P_a}{Ad} = 2\pi f \left(\frac{E}{d}\right)^2 mK\alpha \quad (8)$$

Substituting the system of units $f$ = frequencies in megacycles per second $E' = \dfrac{E}{d}$ = voltage gradient in kilovolts per inch $e'' = K\alpha$ = loss factor Power density $= 1.41 f(E')^2 e''$ watts/cu. in. which is power density Formula 1.

One form of the invention resides in the provision of a dielectric mold made of wood coated or impregnated with a water and heat-resistant synthetic resinous material having dielectric properties conforming to the objects of the invention. Examples of resinous materials and intermediates which may be employed to impregnate the wood of the mold include the reactive components and intermediates of amine-aldehyde type resins, such as urea and formaldehyde, dimethylolurea, melamine and formaldehyde, and similar water soluble reactants. The invention may be carried out by impregnating or coating the wood by means of a water solution and thereafter heating the impregnated or coated wood to form the final water- and heat-resistant resin in situ in the pores of the wood. Similarly, there may be employed a solution of a phenol and an aldehyde, as phenol and formaldehyde or a soluble intermediate condensation product of this type, as is well known in the synthetic resin art. Additional types of thermosetting resins, known to the art, may likewise be utilized so long as their reactive components or intermediates are soluble in water or other solvent capable of penetrating wood to reach a region at least an appreciable distance below the surface thereof. Other examples of thermosetting resins are alkyd resins and unsaturated polyesters.

Another and newly developed class of synthetic resinous material which may be utilized in the invention is the group of silicon-oxygen polymers (silicone resins) recently of commercial importance in heat-resisting plastic applications and in the electrical insulating field. One ready method of utilizing silicone resins is by exposing a wood panel or a fabricated wood mold to a vapor or liquid alkyl or aryl silicone chloride, to form hydroxysilanes or silicols in situ in and on the wood by reaction of the chloride with moisture therein and thereon. The silicols, so provided, either spontaneously polymerize or condense to form heat and water-resistant silicone resins or do so on exposure to heat. A volatile liquid suitable for this treatment is one sold under the trade name "Dri-Film" by General Electric Co., and is thought to be substantially a mixture of methyl silicon trichloride and dimethyl silicon dichloride (or methyl-chlorosilanes). Another type of commercial product which is available for coating and/or impregnating wood with a silicone resin is sold as "Silaneal" by the Dow-Corning Corp., and is represented to be a solution of an intermediate substance which forms a silicone resin under the influence of heat. This latter product may be used to impregnate or coat the wood, after which the wood may be heated to drive off the solvent and polymerize or condense the intermediate substance to a silicone resin.

A third group of synthetic resins which may sometimes be employed in the present invention includes certain high melting thermoresponsive resins which may be formed in situ (as by impregnating wood with chlorostyrenes or solutions thereof and polymerizing such monomer in the pores of the wood). Wood may also be coated and impregnated somewhat by organic solvent solutions of thermoresponsive resins, including as a further specific example vinylcarbazone resins.

Dimethylolurea is one example of a urea-formaldehyde type resin which may be used in carrying out this invention. A comparatively porous wood, when coated or impregnated with urea-formaldehyde type resin and cured to the point of resinification of the impregnant, has dielectric properties which make it particularly adaptable as a material for making such a mold. It is well known as one of the intermediate products in the preparation of urea-formaldehyde type resins. It has recently become practicable to prepare this compound on a commercial scale. It is capable of further stages of condensation to form resins having very useful properties. Dimethylolurea is quite water soluble and is, therefore, valuable as an impregnating material. Products from the more advanced stages of the condensation reaction between formaldehyde and urea are progressively less soluble and even highly water-resistant according to the degree of cure to which the composition has been subjected.

Although any wood in sections of thickness not greater than ⅛ inch may be impregnated with the urea-formaldehyde type solution, porous varieties of wood are more suitable because of their greater capacity to absorb the solution. Also, uniform pressure or vacuum conditions are obtained more quickly through a wooden section if the wood is porous, thereby quickening the rate of impregnation. Arkansas willow is one of the preferred varieties of wood most suitable for this invention because of its high porosity. After impregnation and during the curing process, the wood may be compressed to form sections of increased strength per unit cross sectional area. Dimethylolurea is one example of the urea-formaldehyde type resin adaptable to impregnate articles or sections composed of laminae which may be pressed together and cured in one operation, the impregnant in this case effectively providing the only adhesive necessary between the plies. Commercial wood products of a highly compressed type formed from woods impregnated with urea-formaldehyde condensation products are also suited for the purposes of this invention. Although dimethylolurea is given as a specific example, other derivative condensation products of urea-formaldehyde type resins may be used.

If it is desired to mold and form the impregnated wood so as to produce curves in the finished mold article, it is practicable to add some urea in the impregnating solution. Wood impregnated with dimethylolurea solution containing up to one part urea to four parts of dimethylolurea is capable of being bent to shape when heated to about 212° F. in a 50 per cent urea solution. The impregnated wood is thereafter cured while it is held in the bent condition at approximately 300° F.

The size of the rubber article to be formed and treated will govern to a great extent the thickness of the mold wall. In general, it will be desirable to make the mold wall no thicker than is necessary for rigidity in handling, storing, and prevention of warping. Additional reinforcing ribs or sections of impregnated wood may be added to the exterior of the walls, if desired, to give additional rigidity to relatively thin walls.

In Fig. 1 of the drawings, an illustrative embodiment of the invention is represented by a mold 1 made in the form of an open box adapted to be used as a form for containing and shaping a mass of frothed aqueous dispersion of rubber or rubber-like composition to be treated by a high frequency electrical field to make a vulcanized sponge rubber article. The pieces or sections 2 of coated or impregnated wood which make up the assembled mold are fitted together preferably with dowelled, dovetailed, or mortised joints and then glued. In the example shown, the sides and bottom are secured together with dowel pins 3 made of laminated wood similar to that of which the sides and bottom are made. A desirable glue for this purpose is a liquid phenol-formaldehyde resin, for example, such as Cascophen LT67 or RS216 manufactured by the Casein Company of America. The top 4 of the mold will be held in place during treatment of material by any suitable press. It is desirable on account of local heating effects that may result under action of the high frequency electrical field, to avoid the use of any metal parts in the finished mold. The mold is so fashioned that frothed material may be poured into the top of the mold to form the complete article without trapping and retaining air in any portions thereof. In this connection, numerous small holes 5 and 6 through the walls and top, respectively, of the mold are of considerable aid in preventing the entrapment of air which results in defective molded articles. These small openings also are essential for the escape of steam during the curing process. While no rule has been developed as to the distribution of the said holes, satisfactory curing is obtained when the holes are two to four inches apart. These holes are of a size through which the ungelled frothed material will not flow. Size is, therefore, dependent to some extent on the depth of the mold, with smaller holes toward the bottom. In curing some of the objects commonly made of sponge rubber of a thickness such as that of cushions and mattresses, holes throughout the mold walls, top and bottom are satisfactory if of the order of ⅛ inch to ¼ inch in diameter. The electrodes should be of a construction such that they do not restrict the escape of vapor through the holes of the top and bottom sections of the mold.

A second embodiment of the invention, represented in Figures 2 to 6, inclusive, is illustrated by a tire mold 10 made of a plurality of laminae 10a of wood coated or impregnated with the resinous material described herein. Each lamination is made of pie-sections 7 which are held together by double dovetailed wedges 8. The laminations are held together by dowels 16 secured by suitable adhesives. The mold is made of two sections, an upper section 11 and lower section 12, having opposed complementary annular recesses which together constitute a molding cavity for a tire 15. The mold is adapted to confine a tire which may be treated in a high frequency electrical field. The two mold sections are held in proper registry by pins 9 in the lower section 12, engaging complementary recesses 9a in the upper section 11. The wood mold, when impregnated with the compositions hereinbefore disclosed, has such dielectric characteristics that when it is subjected to high frequency electrical energy, its temperature will rise at about the same rate as that of the unvulcanized rubber of the tire. This situation results in a minimum of heat transfer between the mold and the tire and insures that all parts of the tire will heat up uniformly and to the same temperature.

An example of the process used in impregnating wood suitable for making a mold of the type under discussion is as follows:

Boards of ¾-inch Arkansas willow are placed in a sealed pressure vessel and subjected to a vacuum of at least 25 inches of mercury for an hour. A 35 per cent methylolurea solution is then allowed to run into the vessel to a level which completely submerges the wood. Vacuum source is disconnected and pressure of 100 pounds per square inch produced in the chamber and maintained for an hour. The solution is then allowed to flow from the chamber. Pressure is reduced to atmospheric and the boards are removed and thereafter placed in a kiln-dryer of the type used to dry green lumber. When dry, the boards are placed in a press. As the press plate temperature reaches 240° F. (the melting point of the methylolurea resin contained in the wood), compression of the wood is commenced. The wood is pressed to ⅜ inch thick and, while at the maximum compression, allowed to heat up to the thermosetting temperature of the impregnating material. Temperatures greater than 310° F. are avoided so that optimum rates of resinification are obtained and the wood itself is not adversely affected. The press must be capable of exerting a plate pressure of 1,500 pounds per square inch; although sufficient compression of the impregnated woods may be obtained at lower pressures.

Component sections of the mold are sawed from the pressed, impregnated boards. Holes ³⁄₁₆-inch in diameter are drilled in all sections 3 inches apart. Topmost section consists of a removable lid through which the frothed material may be poured and the cured article removed. All other joints are dowelled and fastened with pegs of the impregnated wood and sealed with a glue such as Cascophen LT67.

The resulting mold apparently suffers no depreciation in electrical characteristics by the electrical curing of sponge rubber therein and may be used indefinitely. It is extremely useful in the curing of sponge rubber because its dielectric properties are such that during the period of cure the heat buildup in the mold itself is such that the temperature of the mold material is approximately the same, i. e., about 212° F., as the cured sponge rubber at the end of the cure period; the result is that sections near the surface of a sponge rubber article are cured to the same degree as the interior sections. Moreover, a mold made of this material may be used indefinitely in high frequency electrical fields to treat rubber compositions without such dielectric failure as will allow arching between the electrodes.

While Arkansas willow is a preferred variety of wood to be used in making a mold suitable for containing a rubber composition to be treated with high frequency energy, other nonresinous soft woods such as, for example, poplar, basswood, and southern cypress, capable of absorbing sufficient methylolurea solution to increase their dry weight density 20 to 40 per cent are suitable for the purposes of the invention.

Other modifications of the invention comprise molds made of synthetic thermosetting resinous substances which are preferably reinforced by fibrous materials such as cotton, nylon, rayon or glass fiber. In general, the resinous substances which can be used for manufacturing suitable dielectric molds may be broken down into three different categories according to their method of manufacture. These categories are as follows:

1. High pressure curing resins including phenolaldehyde resins of the type known as "Bakelite"; urea-formaldehyde resins; and melamine-formaldehyde resins, 2. Intermediate pressure-curing resins such as special phenol aldehyde types of which "Heresite" is one example, and 3. Contact or low pressure-curing resins.

The latter type resins will cure at low or zero pressure. Apparently the commercial resins of this type all belong to the "polyester" type, although the exact chemical composition of these products is not known. An example of this type is a product known as "Selectron" which the manufacturer calls an "allymer," or a resin based or allyl alcohol. Another composition with similar characteristics is known as "Plaskon 911."

It is possible to make satisfactory dielectric molds of the above resinous materials either with or without reinforcing elements. As has been pointed out above, it is necessary that these molds be rugged and capable of withstanding considerable shock. The shock-resisting properties of the molds are increased by reinforcing the plastic material with fibrous materials such as cotton, nylon, rayon or glass fibers. Of the above-named materials, glass fiber is preferable.

The modification of the invention shown in Fig. 7 comprises a mold made of materials such as nylon, rayon, cotton or glass fibers serving as a base, or reinforcing, which materials are impregnated or bound together with a synthetic thermosetting resinous substance. The mold is made up of a plurality of laminations of such impregnated material which are shaped in a mold and cured by the application of heat. When this mold is used in treating rubber or rubber-like material by the application of high frequency energy, the power is applied by means of flat plate electrodes, not shown, placed adjacent the top and bottom of the mold.

Figure 9:
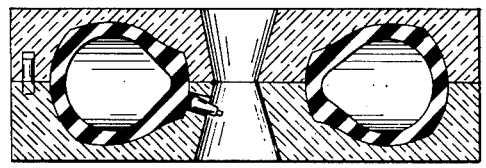
Fig. 9 is a section on line 9—9 of Fig. 8.
Figure 8:
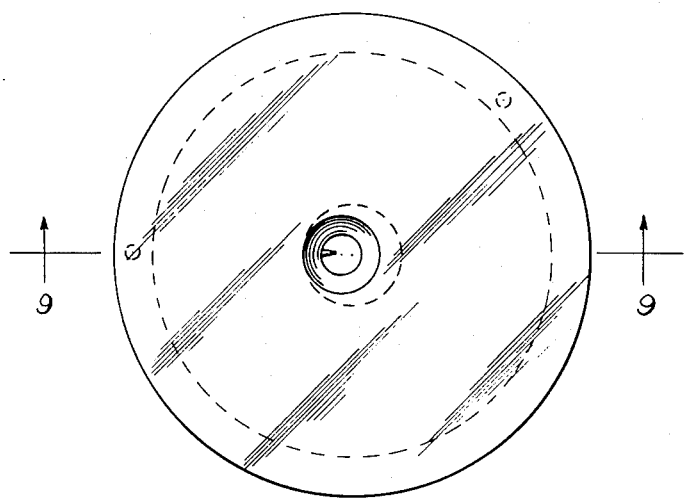
Fig. 8 is a plan view of another embodiment of the invention.

In Figs. 8 and 9, a further modification of the invention is shown in which the reenforcing materials enumerated above are impregnated or bound together with a suitable thermosetting resin and used for making a tire mold. The mold is made in two halves which are separated along the central plane of the tire in the usual manner.

The modification shown in Fig. 10 comprises a mold fabricated of the materials set forth immediately above made in the form of a double tire mold. Suitable electrodes through which high frequency electrical energy may be applied, are embedded in the mold and are so shaped and spaced as to produce the desired distribution of electrical field around the tire. The mold is made in three parts in which the central part has two annular cavities arranged in back-to-back relation and two outside mold sections which have cavities which are complementary to the respective cavities in the central part.

In Fig. 11 a further modified form is shown in which the mold is made of two different types of dielectric material. The main body of the mold is made of an inexpensive resin or resin reinforced by suitable fibrous material. The molding surfaces of the annular cavity are made of material which is best adapted to receiving impressions for molding tire treads.

The modification shown in Fig. 12 is similar to that shown in Fig. 7 except that in Fig. 12 the mold is provided with a cover having a lining which is made of resin impregnated fibrous material. The lining may be pre-formed to give the desired configuration to the article to be treated in the mold.

It has been found that all of the favorable conditions of the herein described type of vulcanization are idealized in a mold made from the same or very nearly the same material as the product under cure, that is to say, rubber. Since the sponge rubber products are usually built from a pure-gum mix, the mold will also preferably be of this character although it may depart therefrom within certain wide limits as may be dictated by considerations such as rigidity, hardness, surface characteristics, etc.

An embodiment of a mold of this type is shown in Figs. 14 to 16 wherein there is a cover member shown generally at 50 and having grid elements 51 strengthening a main top plate 52. The latter carries a pattern of knobs 53 through a reduced shank 54 on each, such knobs being conventionally employed to provide cavities in molded cushions.

The lower portion of the mold consists essentially of a mass of pure-gum vulcanized rubber 55 of an inner form appropriate to the article to be molded. Carried on its lower surface, and preferably bonded thereto, is a metal or otherwise rigid plate 56 to prevent bending of the bottom as a whole.

Hinge members 57 attached to the plate 52 as by screws 58 carry pins 59 loosely lodged in recesses 60 in the uprights 61 of a channel embedded in the rubber portion of the mold. Articulated members shown generally at 62 provide for holding the cover plate in open position.

Locking members 63 are attached to the cover plate 52 and include an overhanging portion having a groove 64 for reception of a fastener such as a rubber band 65 which may be slipped to one side when it is desired to raise the cover, the band being anchored in a recess 66 in the base of the mold.

Upper and lower electrodes are shown at 67, 68, slightly spaced from the mold and bearing leads 69, 70.

Since the rubber mold described and shown serves to materialize an embodiment of the invention which achieves in ideal fashion the results sought in the various other embodiments shown, it will be apparent that what has been said regarding the latter in the matter of dimensions and spacing will apply in like manner to the rubber mold.

A mold made in accordance with the invention as set forth above will have substantially the same dielectric loss factor as the rubber composition in the incompletely treated stage. Therefore, when the mold and the material are being treated by a high frequency electrical field, the temperature rise of the mold will be about the same as that of the material, so that there will not be appreciable heat transfer between the material and the mold. Under these conditions during treatment by high frequency energy, all portions of the material will be subjected to substantially the same temperature simultaneously.

As used herein, the term "impregnated" is not to be interpreted as being limited to that condition in which the resinous composition completely fills the pores of the wood. The term is used in a generic sense to refer as well to a condition in which a material or the fibers thereof are bound together, coated, or surrounded, or where the interstices between the material are filled with the impregnant.

Although the description of the present invention refers to results obtained using frequencies ranging from one to fifty megacycles because of the limited availability of the high frequency equipment, it is to be understood that this invention is not limited to that range of frequencies. Therefore, the term "high frequency" is used herein to denote frequencies, preferably above the supersonic range and including those frequencies which give rise to electromagnetic waves having quasi-optical characteristics. The term "high frequency electrical field" is used to define the electromagnetic field as well as the electrostatic field which necessarily accompanies the high frequency current.

Modification may be resorted to and changes may be made in details and proportions adopted, without departing from the spirit or scope of the invention.

What is claimed is:

1. A mold for containing and forming rubber-like moldable materials while said materials are being treated by high frequency electrical energy, said mold comprising a coherent body of permanent form having a surface defining a molding cavity and comprised substantially of a dielectric material of the same composition as the rubber or rubber-like materials to be molded and cured, electrodes on opposite sides of said mold, and a source of high-frequency current connected between said electrodes.

2. A mold for containing and forming rubber-like moldable materials while said materials are being treated by high frequency electrical energy, said mold comprising a coherent body of permanent form having a surface defining a molding cavity and being comprised substantially of rubber-like dielectric material, electrodes on opposite sides of said mold, and a source of high-frequency current connected between said electrodes.

3. A mold for containing and forming rubber-like moldable materials while said materials are being treated by high frequency electrical energy, said mold comprising a coherent body of permanent form having a surface defining a molding cavity and being comprised substantially of a dielectric rubbery material electrodes on opposite sides of said mold, and a source of high-frequency current connected between said electrodes.

4. A mold for containing and forming rubber-like moldable materials while said materials are being treated by high frequency electrical energy, said mold comprising a coherent body of permanent form having a surface defining a molding cavity and being comprised substantially of pure gum rubber, electrodes on opposite sides of said mold, and a source of high-frequency current connected between said electrodes.

5. A mold for containing and forming rubber-like moldable materials while said materials are being treated by high-frequency electrical energy, said mold comprising a coherent body of permanent form having a surface defining a molding cavity and comprising in a region adjacent to and including said surface, a rubbery dielectric material having a loss factor substantially equal to that of the rubber-like materials to be molded and cured, electrodes on opposite sides of the mold, a source of high-frequency current connected between said electrodes, said dielectric material comprised of a substance impregnated with a rubbery water resistance, heat resistant thermosetting material.

6. A mold for containing and forming rubber-like moldable materials while said materials are being treated by high-frequency electrical energy, said mold comprising a coherent body of permanent form having a surface defining a mold cavity and composed of a rubbery dielectric material having a loss factor substantially equal to that of the rubber-like materials to be molded and cured, electrodes on opposite sides of said mold, and a source of high-frequency current connected between said electrodes, said rubbery material comprised of a substance impregnated with a rubbery water resistance, heat resistant thermosetting material.

References Cited in the file of this patent

UNITED STATES PATENTS

| | | |
|---|---|---|
| 1,527,206 | Marquette | Feb. 24, 1925 |
| 2,280,771 | Du Four et al. | Apr. 28, 1942 |
| 2,421,097 | Lakso | May 27, 1947 |
| 2,441,548 | Sperry | May 11, 1948 |
| 2,451,992 | TeGrotenhuis | Oct. 19, 1948 |
| 2,458,864 | Linsday | Jan. 11, 1949 |

OTHER REFERENCES

"Modern Plastics," Plastic Molds for Electronic Vulcanizing, pages 142 to 145, July 1946.